Figure 1:
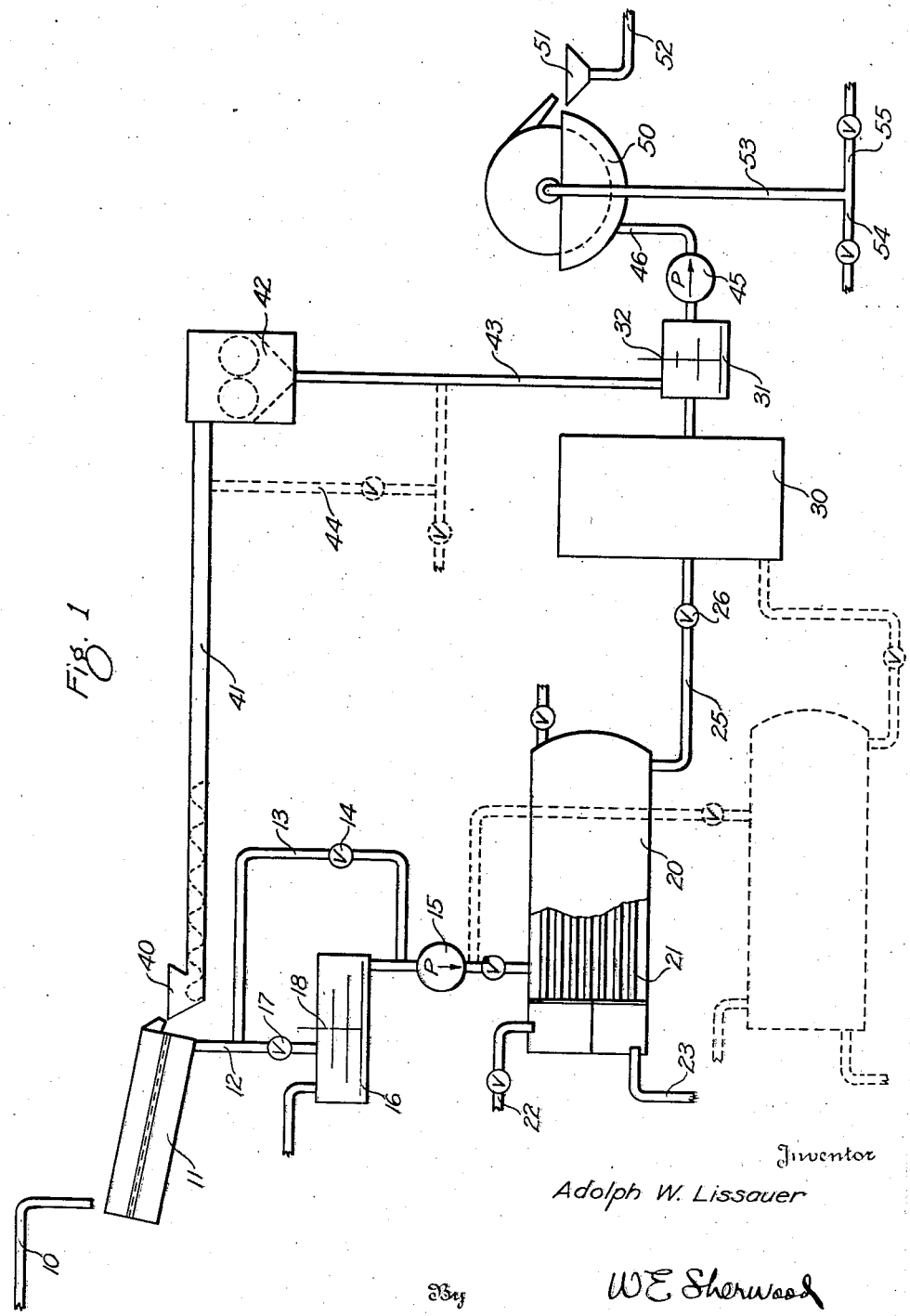

Nov. 5, 1940.　　　A. W. LISSAUER　　　2,220,844
METHOD OF DISTILLERY SLOP FILTRATION
Filed May 13, 1938　　　2 Sheets-Sheet 1

Inventor
Adolph W. Lissauer
By W. E. Sherwood
Attorney

Nov. 5, 1940.  A. W. LISSAUER  2,220,844
METHOD OF DISTILLERY SLOP FILTRATION
Filed May 13, 1938  2 Sheets-Sheet 2

Inventor
Adolph W. Lissauer
By  W. E. Sherwood
Attorney

Patented Nov. 5, 1940

2,220,844

UNITED STATES PATENT OFFICE 2,220,844

METHOD OF DISTILLERY SLOP FILTRATION

Adolph W. Lissauer, Louisville, Ky., assignor to Louisville Drying Machinery Company, Louisville, Ky., a corporation of Kentucky Application May 13, 1938, Serial No. 207,769

9 Claims. (Cl. 210—62)

This invention relates generally to a new and improved method of treating distillery slop and in a more limited sense to a process of preparing the slop for filtration and to the filtration of such prepared slop.

As is known to those skilled in the art the residual slops derived from the distillation processes used in the production of Bourbon and rye whiskeys and in other analogous distillations possesses a complex structure requiring special treatments for purposes of recovering useful by-products and for reducing the problems of disposal. Such slops contain cellulosic and protein materials of varying proportions and derived from various sources. Proteins such as zein obtained from corn, hordein obtained from rye or barley, enzyme diastase from malt, proteins from yeast, and other proteins and cellulose found in the several materials employed during the distillation processes may be specifically mentioned. Some of these materials are in the form of heavy husks and shells of the grain and which are held merely in mechanical suspension in the slop liquids. Other of these materials are finely divided and are present in minute colloidal suspensions while still other of the materials occur in true solution with such liquids. Since the recovery of a maximum amount of all of these forms of material is desirable both from the standpoint of reduction of the slop disposal problem and from the advantage of recovering valuable grain of high protein content for stock feed, any process which can achieve these desired ends serves to fill a long felt need in the industry.

Furthermore the clarification of filtrate made possible by this invention assures the distiller of a ready source of material which may be used for "back-set" fermentation and in larger proportions than formerly possible with conventional practices. When the present type of acidic thin slop containing quantities of solids is recirculated in prior stages of the fermentation processes in order to assist the fermentation of the sour mash a gradual accumulation of solids takes place in the fermenters with the result that periodically the operator is compelled to discard the sour mash and to begin operations with sweet mash. In this event a loss in efficiency of alcohol output occurs. Moreover, by virtue of the possible increased use of larger "back-sets" of clarified thin slop as taught herein smaller quantities of liquid effluent require disposal and this problem is thus simultaneously reduced.

As one object this invention teaches a process for recovering a larger amount of protein material from distillery slop than that heretofore recovered by conventional processes.

A second object is the teaching of a process for producing a liquid effluent from distillery slop substantially free of protein material.

A further object is the teaching of a process for producing a liquid effluent of distillery slop adapted for use as a fermentation aid in a previous operation of the distilling process.

A further object is the teaching of a process of treating distillery slop ingredients in preparation for an efficient filtration process.

A further object is the teaching of a process of filtering previously treated distillery slop.

A further object is the provision of an improved by-product of distillery slop.

Figure 2:
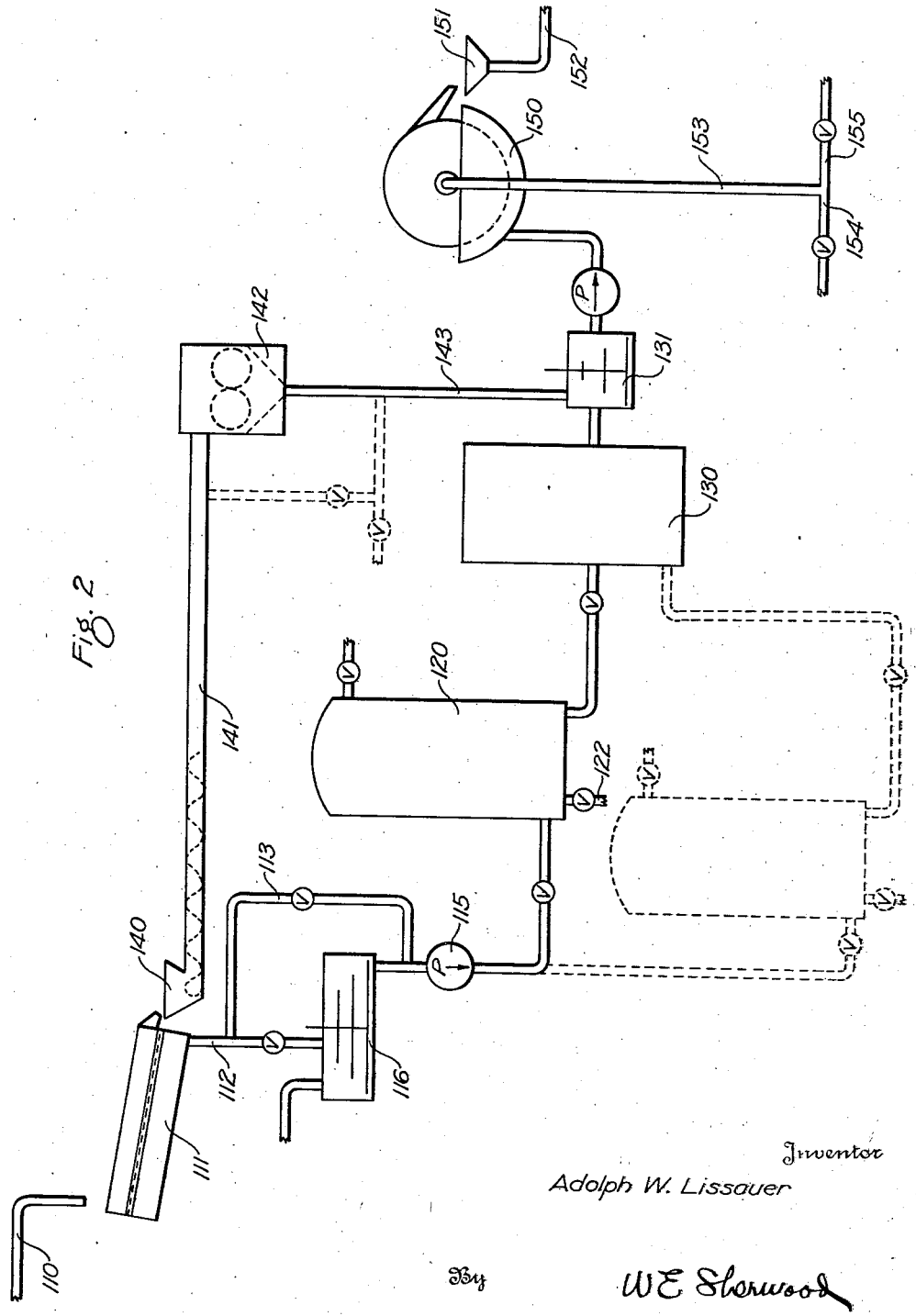

Other objects and advantages will become more apparent when considered in conjunction with the accompanying diagrammatic drawings in which Figure 1 illustrates one arrangement of apparatus suitable for practicing the invention and Figure 2 illustrates a modified arrangement of structure.

Thick slop coming from the still through pipe 10 shown in Figure 1 may be delivered to any suitable apparatus such as filter 11 in which a rough separation of solids and liquids is effected. While this separation will preferably be carried out in any efficient filtering means, in general the large and heavy solids of suspension such as the bran flakes, husks and shells of the grain chiefly will be separated while a substantial part of the small light particles will pass with the large quantities of hot liquid into pipe 12.

This thin slop may have a pH value of approximately 4.2 depending upon the nature of the slop, but regardless of its exact value it will definitely be of acidic character. Contained within the thin slop is the protein material which will be found in true solution, in colloidal suspension and probably also in mechanical suspension. The aggregate quantity thereof moreover is sufficient to add appreciably to the quantity and quality of the potential grain recovery provided an adequate method of separating the same from the large quantities of liquid can be employed.

In accordance with the invention this thin slop from pipe 12 may be directed through pipe 13 controlled by valve 14 into a pressure vessel 20, herein shown as an indirectly heated boiler type.

Contained within vessel 20 may be any desired heat exchange means such as tubes 21 to which steam may be supplied thru pipe 22 and from which condensate may be drained thru outlet 23. Suitable conventional control means for the steam lines and suitable gauges, pressure relief means, blow off means for entrapped air, temperature and pressure recording means, safety valves and the like may obviously be employed when desired and as such form no essential part of the invention regardless of whether shown or lacking in the disclosure hereof.

Intermediate pipe 13 and vessel 20 is a pressure pump 15 serving to establish a desired pressure within vessel 20 when the outlet line 25 leading into flash reservoir 30 is closed by valve 26. Although the apparatus as thus shown would appear to indicate a batch operation upon the thin slop it is contemplated that a plurality of such vessels 20 adapted to be used seriatim and a second of which is indicated in dotted lines may be interposed in parallel between a pressure source, such as pump 15, and the delivery point such as flash reservoir 30, in order to achieve a substantially continuous operation and flow of treated slop. Moreover, it is contemplated that any suitable continuous recirculating of portions of the thin slop by pump pressure thru the heated vessel may be employed if desired without departing from my invention.

When the untreated thin slop of acidic character is thus subjected to pressures in the range of 30–50 pounds per square inch gauge and at temperatures substantially above 212° F. the protein materials contained therein assume a flocculent, coagulable state which upon later release of pressure and lowering of temperature do not revert to their colloidal or dissolved states, but on the contrary become a comparatively easily settleable precipitate. While it is thought that the pressure-heat treatment may cause certain of the colloidal materials to go into true solution even though they were not in solution prior to the treatment, nevertheless the later stages of treatment appear to bring that particular group of materials back out of solution. Those proteins and cellulosic materials on the other hand which are coagulated by the pressure heat treatment do not appear to change but remain recoverable.

In the event that it is desired to adjust the pH value of the thin slop in order to aid in bringing down the phosphates or other ingredients which assist in filterability of the materials all or any part of the thin slop from pipe 12 may be directed into a tank 16 controlled by valve 17 and into which any desired alkaline material, for example lime, may be added and mixed therewith by an agitator 18. One material advantage of so raising the pH value as to diminish the acidity of the slop resides in the fact that corrosion problems in the pressure-heat vessel 20 are thus diminished. Furthermore, with certain types of slop it may be desirable to treat the same at or near its neutral point rather than at a low pH value.

After a period of retention in vessel 20 the hot slop and its flocculent precipitate of protein materials are directed into any suitable apparatus 30, herein called a "flash reservoir," in which the pressure on the hot slop is reduced. Such a reduction from the superatmospheric pressure at high temperature causes substantial amounts of water vapor to flash into steam which may be removed at the top of the reservoir. Incidentally this removal of water vapor by evaporation also reduces the amount of slop liquid for which disposal must be provided.

During this pressure relief step those proteins which have been coagulated during the previous pressure-heat treatment remain in the form of a filterable precipitate.

From reservoir 30 the hot slop residue preferably at atmospheric pressure may be led into a mixing apparatus 31 in which it is stirred by mixer 32 with the filter aid material now to be described.

Following the separation of solids and liquid in filter 11 the solids deposited in hopper 40 may be moved in any suitable manner as by conveyor 41 into apparatus such as hammermill 42 in which such solids will be broken up into subdivided form. In general, the solids entering hopper 40 are the larger shells of the grain used in the mash and are a porous mass of non-uniform size saturated with moisture. While solids in this form have been dried and used for stock feed they are comparatively inefficient for use as a filter aid for the protein precipitate. By subdividing them as in a hammermill the solids passing into conduit 43 will be of a reduced uniform size and may be mixed intimately with the thin slop and precipitate entering mixer 31. Obviously, if desired all or any part of the solids from conveyor 41 may be diverted from passage through apparatus 42, as by means of controlled conduit 44, if occasion should so require. Moreover, if desired a part of such solids could be taken separately from conduits 44 or 43 and led to a drier without serving as a filter aid. However, since a more thorough dewatering of these wet solids can usually be secured in the filtration unit than otherwise, as by a press, this practice is not recommended except when an excess of solids over that required for a filter aid is found to be present.

Upon being intimately mixed with the thin slop and precipitate in mixer 31, the filterable subdivided large solids and its accompanying materials may be moved into any suitable filtering apparatus 50. Preferably such an apparatus will comprise an efficient pressure differential filter of the continuous type, such as a vacuum filter. When needed a pump means 45 may be employed to supply a suitable amount of material through pipe 46 into the filter 50 and if desired an overflow connection, not shown, may be used to maintain the level of submergence of the filter at a constant level requisite with maximum efficiency.

By virtue of the uniform filter aid thus provided and comprising entirely a material which is to become the useful by-product, a cake of solids will be formed quickly on the surface of the filter and will serve to filter from the liquid not only the protein precipitate resulting from the previous stages of treatment, but also substantially all of the small protein particles floating in the liquid. The cake thus formed will then receive a dewatering treatment as it leaves the filter bath and will be delivered into hopper 51 with a reduced moisture content suitable for immediate drying without requiring a separate pressing step. Any suitable conduit 52 may lead the cake material to a point of use.

The liquid filtrate may be led from the filter through pipe 53 into pipes 54 and 55 controlled by suitable valves. Pipe 54 for example may lead back to a prior stage of the distilling process as into a fermenter when the liquid is being used for "set-back" or acidic component in the fermentation in the sour mash process. Pipe 55 on the other hand may lead to any point of disposal as when the liquid is being directed to waste. If desired, the liquid from pipe 53 may be divided by manipulation of the respective valves so as to divert it into both pipes 54 and 55 simultaneously.

In passing through the above process the liquid in pipe 53 will be substantially free of solids of any character, will be unadulterated since no artificial filter aid is used and will be acceptable for use in the fermenters since no building up of the solids therein can occur as a result of using a "set-back" liquid free of solids. Since the natural acidic character of the liquid is desired in this usage, however, the alkaline treatment in tank 16 will be omitted when the liquid is to be directed into pipe 54 or if used will not be employed sufficiently to neutralize or render the slop basic in character. On the other hand, when the liquid is to be directed into waste outlet 55 the alkaline treatment may or may not be used since the liquid will have had its solids removed and the pH value of the waste effluent is only of secondary interest so long as the protein content of the liquid is at a low or reduced value.

Simultaneously with the reduction of the protein content in the waste liquid a corresponding increase in the amount of the solids recovered in the filter cake and the protein content of the same is taking place. In this way the invention makes available to the user a process whereby a superior and larger useful by-product may be secured and in which that by-product is unadulterated by the omission of any artificial filter aid materials. Although the invention is primarily directed to a process and may be practiced independently of any specific apparatus, I have shown in Figure 2 a second arrangement of apparatus which may be employed if desired.

Thick slop entering through pipe 110 may be filtered in filter 111 and the separated large solids may move through hopper 140, conveyor 141, Buhr or attrition mill apparatus 142 and pipe 143 into mixer 131. The thin slop may move into pressure vessel 120 either through pipe 112 and pipe 113 or through pipe 112 and alkaline treating tank 116 into the same vessel or may follow both paths simultaneously. The use of pump 115 is optional and may be dispensed with if desired.

Pressure vessel 120 in this instance may be of the direct heat exchange type and may be supplied with steam under pressure through inlet pipe 122. After vessel 120 has been filled to the proper level with either the treated or untreated thin slop the material may be heated under pressure by the steam in contact therewith and may be maintained under these conditions for a length of time sufficient for the formation of the coagulated, settleable precipitate of protein and other material above described. Thereafter the hot materials under pressure may be directed into flash reservoir 130 at which time quantities of vapor will be flashed off as steam. The remaining liquid and accompanying precipitate will be directed to mixer 131 and then be passed together with the filter aid into filter 150. As before indicated a plurality of such pressure vessels 120 may be employed in order to afford a continuous operation, and one other such vessel is shown herein in dotted lines.

The filter cake from filter 150 will be directed into hopper 151 and removed by conduit 152 while the clarified filtrate may be directed into either or both of pipes 154 and 155 from pipe 153 for the purposes heretofore disclosed.

In other respects also the apparatus disclosed in Figure 2 is intended to be employed in the same manner as the apparatus described in Figure 1.

As will be apparent the invention thus discloses a self contained process in which no external filter aid materials are required and which results in a completely unadulterated final by-product and final liquid effluent with the exception of the alkaline material which use is optional. Even when this material is employed as a precipitation aid no adverse effect on the useful by-product or the liquid waste is noted and the only possible disadvantage is the elimination of the set-back fermentation usage when the alkaline treatment gives too great an increase in the pH value of the thin slop.

Having thus described the invention, I claim:

1. The method of treating thick distillery slop comprising: separating the large solids and thin slop constituents of the thick slop; reducing the size of the large solids; precipitating protein material from the thin slop under superatmospheric pressure; mixing the reduced solids with the thin slop and precipitate in order to provide a filter aid therefor; and filtering the solids and precipitate from the mixture by means of a pressure differential filter apparatus.

2. The method of treating thick distillery slop comprising: separating the large solids and thin slop constituents of the thick slop; reducing the size of the large solids; precipitating protein material from the thin slop under superatmospheric pressure and at a temperature higher than the temperature of the thick slop; mixing the reduced solids with the thin slop and precipitate in order to provide a filter aid therefor; and filtering the mixture.

3. The method of treating thick distillery slop comprising: separating the large solids and thin slop constituents of the thick slop; reducing the size of the large solids; precipitating protein material from the thin slop under superatmospheric pressure and at a temperature substantially above 212° F.; mixing the reduced solids with the thin slop and precipitate in order to provide a filter aid therefor; and filtering the mixture.

4. The method of treating thick distillery slop comprising: separating the large solids and thin slop constituents of the thick slop; reducing the size of the large solids; adjusting the pH value of the thin slop by alkaline treatment; precipitating protein material from the treated thin slop under superatmospheric pressure; mixing the reduced solids with the treated thin slop and precipitate in order to provide a filter aid therefor; and filtering the mixture.

5. The method of treating thick distillery slop comprising: separating the large solids and thin slop constituents of the thick slop; reducing the size of the large solids; adjusting the pH value of the thin slop by alkaline treatment; precipitating protein material from the treated thin slop under superatmospheric pressure and at a temperature substantially above 212° F.; mixing the reduced solids with the treated thin slop and precipitate in order to provide a filter aid therefor; and filtering the mixture.

6. The method of clarifying distillery slop liquids comprising: separating large solids and thin slop constituents of the thick slop; reducing the size of the large solids; adjusting the pH of the thin slop; precipitating protein material from the treated thin slop under superatmospheric pressure; mixing the reduced large solids with the thin slop and precipitate; filtering the solids and precipitate from the mixed materials in a pressure differential filter apparatus; and directing the clarified filtrate to a point of disposal.

7. The method of increasing the yield of by-product grain from thick distillery slop comprising: separating large solids and thin slop constituents of the thick slop; forming a filter aid by subdividing the large solids; precipitating protein material from the thin slop under superatmospheric pressure and at a temperature above the atmospheric boiling point of the liquid ingredients; mixing the filter aid with the thin slop and precipitate; and filtering the solids and precipitate from the mixed materials to form a cake of by-product grain material.

8. The mehod of filtering thick distillery slop comprising: separating the large solids and thin slop constituents of the thick slop; subdividing the separated solids to form a filter aid of uniform small sized particles; mixing the subdivided solids with the thin slop; filtering the mixture; and removing the filtered solids and filter aid in the form of a cake of grain unadulterated by artificial filtering materials.

9. The method of treating thick distillery slop comprising: separating the large solids and thin slop constituents of the thick slop; reducing the size of the large solids; heating the thin slop above 212° F. under superatmospheric pressure; flashing the thin slop to remove water therefrom; mixing the reduced solids with the flashed slop; and filtering the mixture.

ADOLPH W. LISSAUER.